(12) United States Patent
Barad et al.

(10) Patent No.: US 10,732,965 B2
(45) Date of Patent: Aug. 4, 2020

(54) SYSTEMS AND METHODS FOR DYNAMIC GENERATION OF QUESTIONNAIRES ON PROGRAMMING CONCEPTS

(71) Applicant: Tata Consultancy Services Limited, Mumbai (IN)

(72) Inventors: Vishal Barad, Gandhinagar (IN); Shyam Sirisha Sreepada, Hyderabad (IN); Kapuganti Reddy Gowtham Kumar, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 36 days.

(21) Appl. No.: 15/419,380

(22) Filed: Jan. 30, 2017

(65) Prior Publication Data

US 2018/0107457 A1 Apr. 19, 2018

(30) Foreign Application Priority Data

Oct. 13, 2016 (IN) .............................. 201621035008

(51) Int. Cl.
*G06F 8/70* (2018.01)
*G06F 8/30* (2018.01)
(Continued)

(52) U.S. Cl.
CPC ................. *G06F 8/70* (2013.01); *G06F 8/30* (2013.01); *G06F 9/453* (2018.02); *G09B 7/04* (2013.01); *G09B 19/0053* (2013.01)

(58) Field of Classification Search
None
See application file for complete search history.

(56) References Cited

U.S. PATENT DOCUMENTS 5,259,766 A * 11/1993 Sack .................. G09B 19/0053
434/323
5,421,730 A * 6/1995 Lasker, III ............... G09B 7/04
434/118
(Continued)

OTHER PUBLICATIONS

Wakatani, Akiyoshi, and Toshiyuki Maeda. "Evaluation of software education using auto-generated exercises." Computational Science and Engineering (CSE) and IEEE Intl Conference on Embedded and Ubiquitous Computing (EUC) and (DCABES) Aug. 26, 2016 IEEE (Year: 2016).*

(Continued)

*Primary Examiner* — Matthew J Brophy
(74) *Attorney, Agent, or Firm* — Finnegan, Henderson, Farabow, Garrett & Dunner LLP (57) ABSTRACT

The present disclosure provides systems and methods for dynamically generating subjective questionnaires on programming concepts in a natural language with desired number of unique questions and having a desired level of difficulty. Conventionally known systems and methods are based on pre-defined templates without any emphasis on logic building for various business scenarios and mostly cater to objective type multiple choice questions. Dynamic generation of subjective questions that are customized to address the needs of each trainee based on an earlier evaluation to make his/her training effective is critical to an effective training. The present disclosure achieves this by providing operations wherein logic building is driven through entities and fields identified for a specific business scenario.

15 Claims, 3 Drawing Sheets

(51) Int. Cl.
*G06F 9/451* (2018.01)
*G09B 19/00* (2006.01)
*G09B 7/04* (2006.01)

(56) References Cited

U.S. PATENT DOCUMENTS

| | | | | |
|---|---|---|---|---|
| 5,602,982 | A * | 2/1997 | Judd | G09B 19/0053 715/709 |
| 5,836,771 | A * | 11/1998 | Ho | G09B 5/00 434/362 |
| 7,681,186 | B2 * | 3/2010 | Chang | G10L 15/1815 717/143 |
| 7,689,410 | B2 * | 3/2010 | Chang | G06F 8/315 704/9 |
| 7,765,097 | B1 * | 7/2010 | Yu | G06F 8/30 704/9 |
| 8,201,139 | B2 * | 6/2012 | Chang | G06F 8/20 717/104 |
| 8,408,912 | B2 * | 4/2013 | Fachar | G09B 19/0053 434/118 |
| 8,700,403 | B2 * | 4/2014 | Weng | G06F 40/216 704/256.2 |
| 8,949,770 | B2 * | 2/2015 | StClair | G06F 8/10 717/101 |
| 9,082,309 | B1 * | 7/2015 | Fuka | G09B 7/00 |
| 9,177,485 | B2 * | 11/2015 | Ishaq | G09B 19/0053 |
| 10,303,441 | B2 * | 5/2019 | Huebra | G06F 8/73 |
| 2002/0012752 | A1 * | 1/2002 | McDougall | G03G 9/0804 430/123.5 |
| 2002/0018984 | A1 * | 2/2002 | Ho | G09B 5/00 434/362 |
| 2002/0127521 | A1 | 9/2002 | Fegan | |
| 2003/0009742 | A1 * | 1/2003 | Bass | G06F 8/20 717/104 |
| 2004/0110120 | A1 * | 6/2004 | Ho | G09B 5/00 434/350 |
| 2005/0273335 | A1 * | 12/2005 | Chang | G10L 15/1815 704/257 |
| 2005/0273771 | A1 * | 12/2005 | Chang | G06F 40/30 717/136 |
| 2008/0294422 | A1 * | 11/2008 | Dalal | G06F 40/40 704/2 |
| 2009/0280456 | A1 * | 11/2009 | Ishaq | G09B 7/00 434/118 |
| 2011/0003272 | A1 * | 1/2011 | Fachar | G09B 19/0053 434/118 |
| 2012/0041950 | A1 * | 2/2012 | Koll | G09B 7/02 707/728 |
| 2015/0074112 | A1 * | 3/2015 | Liu | G06F 16/43 707/739 |
| 2016/0098645 | A1 * | 4/2016 | Sharma | G06N 20/00 706/12 |
| 2017/0003937 | A1 * | 1/2017 | Huebra | G06F 8/20 |
| 2017/0039188 | A1 * | 2/2017 | Allen | G06F 8/73 |
| 2017/0060555 | A1 * | 3/2017 | Allen | G06F 8/34 |
| 2017/0220327 | A1 * | 8/2017 | Allen | G06F 8/30 |
| 2017/0371626 | A1 * | 12/2017 | Abebe | G06F 8/30 |
| 2018/0018169 | A1 * | 1/2018 | Dhondse | G06F 8/77 |
| 2018/0074820 | A1 * | 3/2018 | Dhondse | G06F 8/77 |

OTHER PUBLICATIONS

Wakatani, Akiyoshi, and Toshiyuki Maeda. "Automatic generation of programming exercises for learning programming language." 2015 IEEE/ACIS 14th International Conference on Computer and Information Science (ICIS). IEEE, 2015. (Year: 2015).*

Saeki, Motoshi, Hisayuki Horai, and Hajime Enomoto. "Software development process from natural language specification." Proceedings of the 11th international conference on Software engineering. 1989. (Year: 1989).*

Keszocze, Oliver, et al. "Lips: An IDE for model driven engineering based on natural language processing." 2013 1st International Workshop on Natural Language Analysis in Software Engineering (NaturaLiSE). IEEE, 2013. (Year: 2013).*

Radošević, D. et al., "Automatic On-line Generation of Student's Exercises in Teaching Programming", Conference Paper, Proceedings of the 21$^{st}$ Central European Conference on Information and Intelligent Systems, Central European Conference on Information and Intelligent Systems, CECIIS 2010, Varaždin, 7 pages, Sep. 22, 2010.

Hellman, M., "Automatic Factual Question Generation from Text", Doctoral Dissertation, Carnegie Mellon University Pittsburg, PA, 203 pages, 2011.

* cited by examiner

SYSTEMS AND METHODS FOR DYNAMIC
GENERATION OF QUESTIONNAIRES ON
PROGRAMMING CONCEPTS

PRIORITY CLAIM

This U.S. patent application claims priority under 35 U.S.C. § 119 to: India Application No. 201621035008 filed on Oct. 13, 2016. The entire contents of the aforementioned application are incorporated herein by reference.

TECHNICAL FIELD

This disclosure relates generally to generation of question banks, and more particularly to systems and methods for dynamic generation of questionnaires on programming concepts.

BACKGROUND

Trainings conducted in the domain of Information Technology (IT) are based on evaluating a trainee on programming concepts of a specific formal language. Such trainings are imperative for building a solid foundation for grooming trainees and enabling them by facilitating as much hands on training for each concept of the specific formal language.

IT industry demands application of various programming concepts to real time business scenarios. To address this demand, trainings have to cater to trainees having different educational backgrounds or work experience. Generating customized questions on need basis to meet different types of training requirements without being limited by type of questions, number of questions and time required to create such questions is a challenge. Again, considering the large number of trainees being groomed for challenging assignments in the IT industry today, it is practically impossible to have a reasonable faculty-trainee ratio. Also, this would result in a lot of dependence on availability of trained faculty for a specific programming language and time investment for generating voluminous, unique set of questionnaires that can address the requirements of the large number of trainees keeping in mind the specific requirements for each trainee based on his/her earlier evaluation to make such trainings effective.

SUMMARY

Embodiments of the present disclosure present technological improvements as solutions to one or more of the above-mentioned technical problems recognized by the inventors in conventional systems.

In an aspect, there is provided a processor implemented method comprising: receiving at least one scenario statement in a natural language pertaining to a domain for generation of at least one questionnaire based on a programming language under consideration; processing the at least one scenario statement to identify a first set of variables corresponding to the domain, the first set of variables including: one or more entities corresponding to the domain, and one or more fields mapped to each of the one or more entities; receiving a second set of variables corresponding to the programming language under consideration, the second set of variables including: one or more programming concepts associated with the programming language under consideration, and one or more operations mapped to the one or more programming concepts, each of the one or more operations being defined by (i) an input based on at least one of the one or more entities and the one or more fields, (ii) an output based on at least one of the one or more entities and the one or more fields and (iii) a description associated with a task to be performed based on the one or more programming concepts; and dynamically generating the at least one questionnaire associated with the domain, the at least one questionnaire comprising a plurality of questions on the programming language under consideration, based on at least some of the one or more entities, the one or more fields, the one or more concepts and the one or more operations.

In another aspect, there is provided a system comprising: one or more data storage devices operatively coupled to the one or more processors and configured to store instructions configured for execution by the one or more processors to: receive at least one scenario statement in a natural language pertaining to a domain for generation of at least one questionnaire based on a programming language under consideration; process the at least one scenario statement to identify a first set of variables corresponding to the domain, the first set of variables including: one or more entities corresponding to the domain, and one or more fields mapped to each of the one or more entities; receive a second set of variables corresponding to the programming language under consideration, the second set of variables including: one or more programming concepts associated with the programming language under consideration, and one or more operations mapped to the one or more programming concepts, each of the one or more operations being defined by (i) an input based on at least one of the one or more entities and the one or more fields, (ii) an output based on at least one of the one or more entities and the one or more fields and (iii) a description associated with a task to be performed based on the one or more programming concepts; and dynamically generate the at least one questionnaire associated with the domain, the at least one questionnaire comprising a plurality of questions on the programming language under consideration, based on at least some of the one or more entities, the one or more fields, the one or more concepts and the one or more operations.

In yet another aspect, there is provided a computer program product comprising a non-transitory computer readable medium having a computer readable program embodied therein, wherein the computer readable program, when executed on a computing device, causes the computing device to: receive at least one scenario statement in a natural language pertaining to a domain for generation of at least one questionnaire based on a programming language under consideration; process the at least one scenario statement to identify a first set of variables corresponding to the domain, the first set of variables including: one or more entities corresponding to the domain, and one or more fields mapped to each of the one or more entities; receive a second set of variables corresponding to the programming language under consideration, the second set of variables including: one or more programming concepts associated with the programming language under consideration, and one or more operations mapped to the one or more programming concepts, each of the one or more operations being defined by (i) an input based on at least one of the one or more entities and the one or more fields, (ii) an output based on at least one of the one or more entities and the one or more fields and (iii) a description associated with a task to be performed based on the one or more programming concepts; and dynamically generate the at least one questionnaire associated with the domain, the at least one questionnaire comprising a plurality of questions on the programming language under consideration, based on at least some of the one or more entities, the one or more fields, the one or more concepts and the one or more operations.

In an embodiment of the present disclosure, the one or more hardware processors are further configured to create (i) one or more repositories of the one or more entities, the one or more fields and the mapping thereof; and (ii) one or more repositories of the one or more programming concepts, the one or more operations, the mapping thereof and formal language syntax rules corresponding to the programming language, in one or more data storage devices.

In an embodiment of the present disclosure, process the at least one scenario statement to identify a first set of variables corresponding to the domain by filtering words in the at least one scenario statement by performing one or more of: stemming the words in the description to obtain root words; eliminating stop words from the at least one scenario statement; eliminating action words from the at least one scenario statement; presenting, to a user, unique words by comparing remaining words in the at least one scenario statement with words in the one or more repositories and filtering out existing words; receiving, from the user, the first set of variables identified from the unique words and corresponding to the domain; mapping the one or more fields from the unique words to the one or more entities; updating the one or more repositories with the one or more entities, the one or more fields and the mapping thereof, from the unique words.

In an embodiment of the present disclosure, at least some of the first set of variables and at least some of the second set of variables are re-usable and having multiple mappings.

In an embodiment of the present disclosure, the one or more hardware processors are further configured to dynamically generate the at least one questionnaire agnostic of the formal language associated with the programming language under consideration and the plurality of questions are in a natural language in a customized manner.

In an embodiment of the present disclosure, the one or more hardware processors are further configured to dynamically generate the at least one questionnaire by selecting a pre-defined level of difficulty associated with either (I) number of the one or more operations included in the plurality of questions or (ii) pre-defined complexity levels associated with the one or more operations included in the plurality of questions.

In an embodiment of the present disclosure, the one or more hardware processors are further configured to evaluate a response to the at least one questionnaire by: generating specific values corresponding to the first set of variables in each of the plurality of questions; generating a compilable code based on the one or more concepts and the one or more operations in each of the plurality of questions and the formal language syntax rules corresponding to the programming language; executing the compilable code using the specific values; generating an output value for each of the plurality of questions; and comparing the output value with an output value of a user compiled code executed using the specific values.

In an embodiment of the present disclosure, the one or more hardware processors are further configured to in dependence on the comparison, determine the first set of variables and the second set of variables for dynamically generating the at least one questionnaire.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Conventionally known resources for generating questions have limited span and quality of the questions are not adequate to certify that a trainee will achieve a desired quality of training to meet industry needs. Each trainee may need a different level of training and accordingly the questions have to be customized to a particular level of difficulty or targeted to particular operations of a programming concept based on evaluation of the trainee to make the training effective. Known systems and methods are template based, limited by predefined constraints on input and output tending to generate either a limited number of questions or general questions that do not address specific needs or they tend to be repetitive. Again, availability of adequate number of trained faculty to cater to specific needs of the huge number of trainees in the IT industry today is practically not possible. Mere automation of question generation cannot address the technical challenge of dynamically generating customized questions targeted to meet needs of each individual trainee with minimum dependence on trained faculty and minimum investment for time and yet meeting the demands of the industry. The present disclosure enables dynamic generation of questions in a natural language in a customized manner, on need basis, agnostic of the formal language with specific emphasis on logic building driven through entities and fields identified for specific business domains or scenarios.

Figure 1:
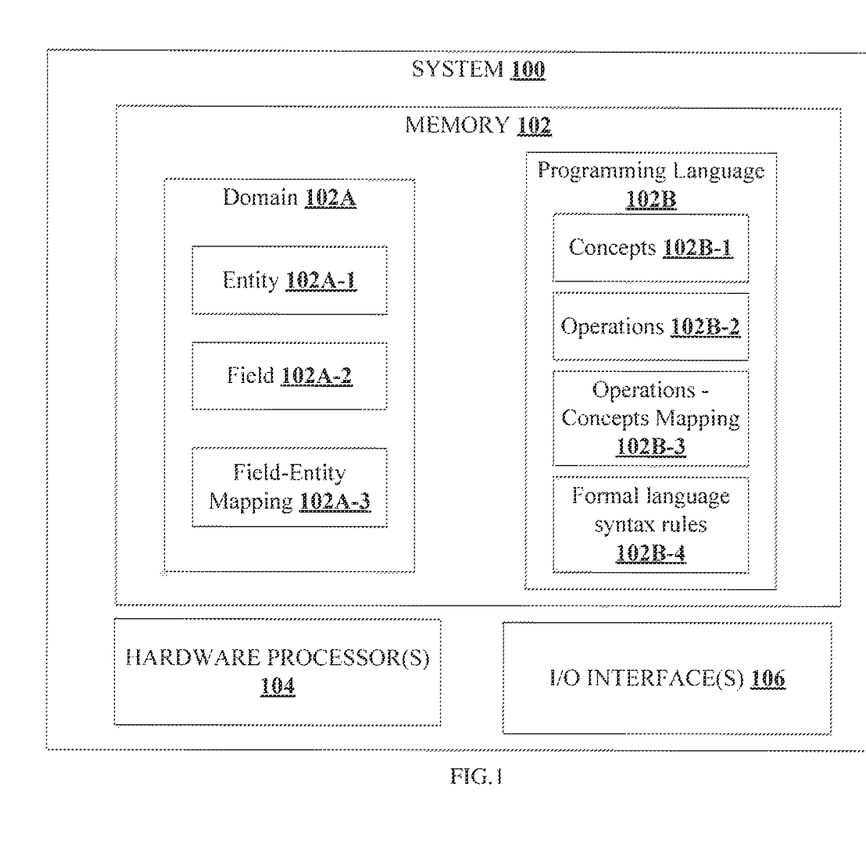
FIG. 1 illustrates an exemplary block diagram of a system for dynamic generation of questionnaires on programming concepts, in accordance with an embodiment of the present disclosure.
Figure 2:
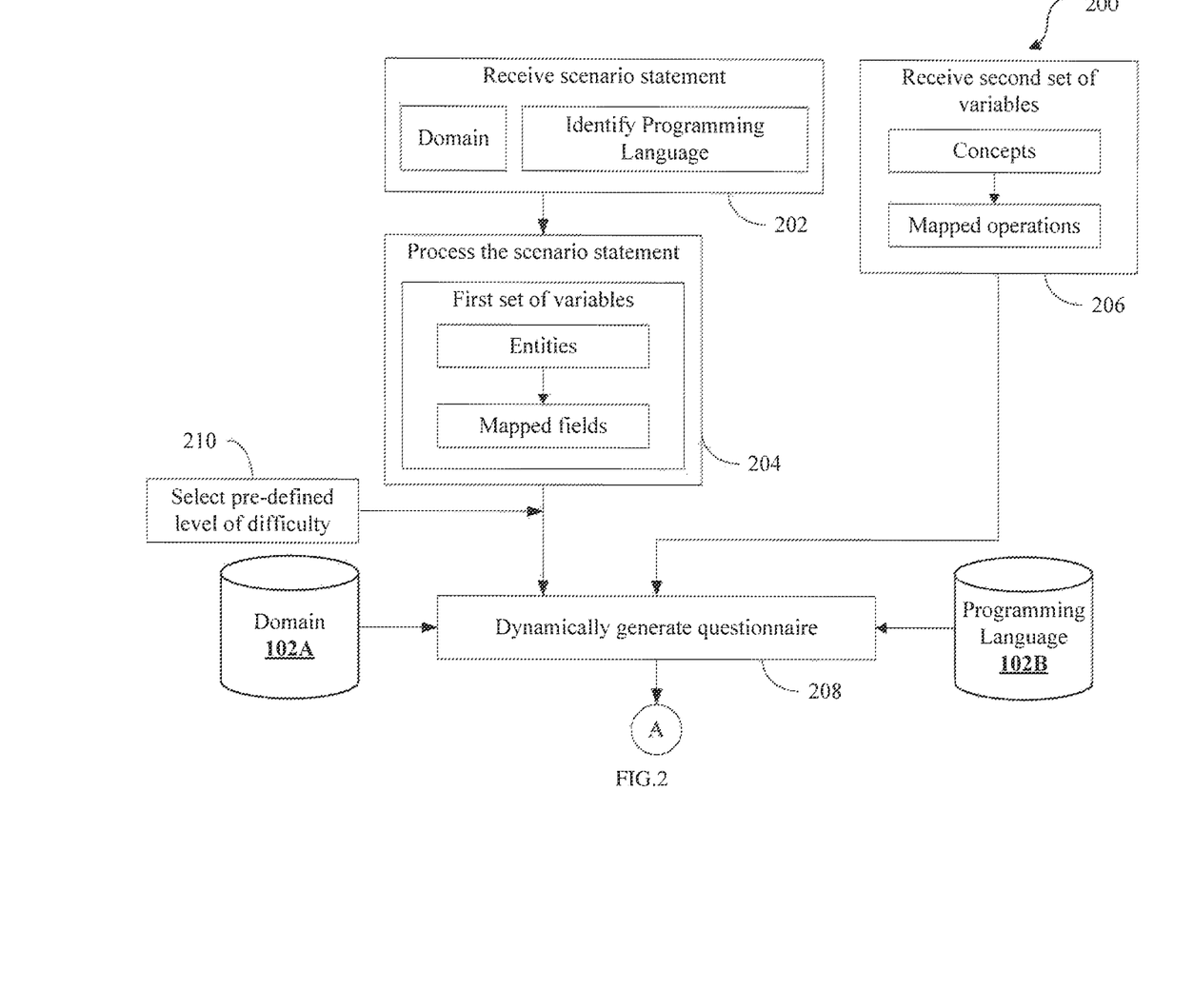
FIG. 2 illustrates an exemplary flow diagram of the method for dynamic generation of questionnaires on programming concepts, in accordance with an embodiment of the present disclosure.

Referring now to the drawings, and more particularly to FIGS. 1 and 2, where similar reference characters denote corresponding features consistently throughout the figures, there are shown preferred embodiments and these embodiments are described in the context of the following exemplary system and method.

FIG. 1 illustrates an exemplary block diagram of a system 100 for dynamic generation of questionnaires on programming concepts, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interlace device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2 illustrates an exemplary flow diagram of the method 200 for dynamic generation of questionnaires on programming concepts, in accordance with an embodiment of the present disclosure, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

In an embodiment, at step 202, the one or more processors 104 of the system 100 are configured to receive at least one scenario statement in a natural language pertaining to a domain 102A for generation of at least one questionnaire based on a programming language 102B under consideration. In the context of the present disclosure, the domain 102A may refer to business scenarios such as Telecom, Retail, Banking, Insurance, Health management, and the like. In the context of the present disclosure, the programming language 102B under consideration may include Java™, Python™, Ruby™, and the like.

In an embodiment, at step 204, the one or more processors 104 of the system 100 are configured to process the at least one scenario statement to identify a first set of variables corresponding to the domain 102A. In an embodiment the first set of variables may include one more entities 102A-1 corresponding to the domain 102A. The one or more entities 102A-1 of the present disclosure can represent tangible objects corresponding to the domain 102A. For instance, if an identified domain 102A is 'Telecom', the entities 102A-1 may be 'connection', 'tariff', 'customer', and the like. In an embodiment, entities of a domain are re-usable and accordingly, an entity such as 'customer' may be mapped to domain 'Telecom' and also to domain 'Retail'. Again, the first set of variables may include on or more fields 102A-2 mapped to each of the one or more entities 102A-1. Mapping of the one or more fields 102A-2 to the one or more entities 102A-1 is generally referenced as 102A-3. The one or more fields 102A-2 of the present disclosure may be attributes of the one or more entities 102A-1. For instance, for an entity "customer", mapped fields may include "customer id", "customer name", "customer age", "customer contact no.", "city", and the like. The one or more fields 102A-2 may also be identified based on the received at least one scenario statement in step 202 as explained later in the description. In accordance with the present disclosure, the one or more fields 102A-2 may be associated with fixed data types such as integer, float, double, string, and the like. In an embodiment, once a field is identified, the associated data type is also identified when mapping the field with an entity.

In an embodiment, at step 206, the one or more processors 104 of the system 100 are configured to receive a second set of variables corresponding to the programming language under consideration. In an embodiment the second set of variables may include one more programming concepts 102B-1 corresponding to the programming language 102B under consideration. In the context of the present disclosure, if the programming language under consideration is Java™, the programming concepts may include Arrays, Iterations, Constructor, Inheritance, Exception Handling, and the like. Again, the second set of variables may include one or more operations 102B-2 mapped to the one or more programming concepts 102B-1. Mapping of the one more operations 102B-2 to the one or more programming concepts 102B-2 is generally referenced as 102B-3. The one or more operations 102B-2 may be defined by at least three parameters such as specific inputs, output and a description of what is to be done. For instance, the one or more operations 102B-2 may be defined by an input based on at least one of the one or more entities 102A-1 and the one or more fields 102A-2, an output based on at least one of the one or more entities 102A-1 and the one or more fields 102A-2 and a description associated with a task to be performed based on the one or more programming concepts 102B-1.

In an embodiment, each of the one or more operations 102B-2 may be associated with a pre-defined complexity level or a combination of the one or more operations 102B-2 may be associated with the pre-defined complexity level.

In an embodiment, the one or more operations 102B-2 may be re-usable since data types associated with the one or more fields 102A-2 are generic and may be re-used for different fields.

In an embodiment, at step 208, the one or more processors 104 of the system 100 are configured to dynamically generate at least one questionnaire associated with the domain 102A. The at least one questionnaire may comprise a plurality of questions on the programming language 102B under consideration. In an embodiment, the questions may be based on at least some of the one or more entities 102A-1, the one or more fields 102A-2, the one or more concepts 102B-1 and the one the one or more operations 102B-2.

In an embodiment, each of the one or more operations 102B-2 is defined by (i) an input based on the one or more entities 102A-1 and the one or more fields 102A-2, (ii) an output based on the one or more entities 102A-1 and the one or more fields 102A-2 and (iii) a description associated with a task to be performed based on the one or more programming concepts 102B-1.

In an embodiment, the one or more processors 104 of the system 100 are configured to create (i) one or more repositories of the one or more entities 102A-1, the one or more fields 102A-2 and the field-entity mapping 102A-3; and (ii) one or more repositories of the one or more programming concepts 102B-1, the one or more operations 102B-2, the operations-concepts mapping 102B-3 and formal language syntax rules 102B-4 corresponding to the programming language 102B, in one or more data storage devices or memory 102.

In an embodiment, at step 210, the one or more processors 104 of the system 100 are configured to select a pre-defined level of difficulty prior to the step of dynamically generating the at least one questionnaire at step 208. The pre-defined level of difficulty may be associated with the pre-defined complexity level, wherein either a number of the one or more operations 102B-2 are combined in a question or the one or more operations 102B-2 themselves are associated with the pre-defined level of complexity.

In an embodiment, at step 212, the one or more processors 104 of the system 100 are configured to evaluate a response provided by say, a user (trainee), to the at least one questionnaire generated at step 208. The one or more processors 104 may randomly generate specific values corresponding to the first set of variables in each of the plurality of questions. A compliable code may be generated based on the one or more concepts 102B-1 and the one or more operations 102B-2 in each of the plurality of questions using the formal language syntax rules 102B-4 corresponding to the programming language 102B under consideration. The compilable code may then be executed using the specific values generated and an output value for each of the plurality of questions may be generated. In an embodiment, the same specific values may be fed to a user compiled code for generating an output value. Depending on the comparison between the output value generated by system generated compilable code and user generated compilable code, the training may be made more effective by determining the first set of variables and the second set of variables to be used for generating the next set of questions. For instance, if the output value of the user generated compilable code is in line with the output of the system generated compilable code, a trainer may decide to generate further questions on the same set of entities, fields, concepts and operations to ensure the trainee is completely trained. Alternatively, the trainer may decide to test other entities, fields, concepts and operations in various combinations to judge competency of the trainee and accordingly customize the questionnaire for effective training. The trainee may himself evaluate his/her performance via such comparison and choose to continue attempting responses to customize questionnaires.

The systems and methods of the present disclosure will now be further enabled through and exemplary embodiment. Let at step 202, a scenario statement be received as—ABC Bank is leading bank in the city. It provides a facility to register customer and accounts. For registering a customer, details required are: id, name, dob, contact, email, salary. Customer once registered, can open multiple accounts with the bank. Each account has unique id, type and is required to maintain a balance. The exemplary scenario statement pertains to the banking domain and the programming language under consideration may be Java™.

In an embodiment, the step of processing the at least one scenario statement 204 to identify the first set of variables corresponding to the domain comprises filtering words in the at least one scenario statement. The step of processing may include stemming the words in the description to obtain root words. In an embodiment, it may include eliminating stop words and/or action words or verbs from the at least one scenario statement. The remaining words are then compared with words in the one or more repositories of the one or more entities 102A-1, the one or more fields 102A-2 to filter out existing words and the unique words are then presented to the user (trainer) who can identify the first set of variables corresponding to the identified domain. The trainer may also map the one or more fields from the unique words to the one or more entities. The one or more repositories are then updated with the identified first set of variables from the unique words. In the exemplary embodiment, the scenario statement is processed to filter out stop words such as "is", "in", the", and the like. Stemming may filter out suffixes such as "ing", "ed", "es", and the like. In an embodiment, action words or verbs may be filtered out based on external APIs and/or verb repositories maintained by the system. Identified action words may be added to the verb repositories. The remaining words post filtering may be presented to the trainer for identification of entity or fields based on the banking domain.

In the exemplary embodiment, the filtered remaining words may be ABC, Bank, city, customer, account, id, name, dob, contact, email, type, salary, id, balance. Trainer, when presented with this list may further filter out words like ABC and identify the first set of variables as follows—

| Details | Entity? Y or N | Attribute of? |
| --- | --- | --- |
| Bank | Y | |
| City | N | Bank |
| Customer | Y | Bank |
| Account | Y | Bank |
| Id | N | Customer |
| Name | N | Customer |
| dob | N | Customer |
| contact | N | Customer |
| email | N | Customer |
| salary | N | Customer |

-continued

| Details | Entity? Y or N | Attribute of? |
|---|---|---|
| Id | N | Account |
| type | N | Account |
| balance | | Account |

Further mapping with field types may be performed as given below.

| Details | Entity? Y or N | Attribute of? | Field Type |
|---|---|---|---|
| Bank | Y | | |
| City | N | Bank | String |
| Customer | Y | Bank | Customer |
| Account | Y | Bank | Account |
| Id | N | Customer | Int |
| Name | N | Customer | String |
| dob | N | Customer | Date |
| contact | N | Customer | Int |
| email | N | Customer | String |
| salary | N | Customer | Double |
| Id | N | Account | Int |
| type | N | Account | String |
| balance | | Account | double |

Consider entities 'Customer' and 'Account' out of the above identified first set of details for further description. Some operations that may be defined for concept 'Arrays' as part of step 206 are expressed as given below by way of examples: Average<F>Value (difficulty level 1): where <F> refers field of types float, double a. Inputs: Array of <E> where <E> refers entity.
b. Output: Double
c. Description: This operation will take array of <E> as input and return the average value of <F>

Sort<F> Value (difficulty level 3): where <F> refers field of type <ALL> (i.e. all field types)

a. Inputs: Array of <E> where <E> refers entity.
b. Output: Array of <E>
c. Description: This operation will take array of <E> as input and sort the same based on <F> value Find<F> value (difficulty level 2): where <F> refers field of type int a. Inputs: Array of <E>, <F> value where <E> refers entity.
b. Output: <E>
c. Description: This operation will take array of <E> as input and return find the first element in the array with <F> value as specified in the input.

At step 208, for dynamically generating at least one questionnaire, a question generation block may be generated as shown herein below.

| Sr # | Domain | Concept | Operation | Driving entity | Inputs | Output |
|---|---|---|---|---|---|---|
| 1 | Banking | Arrays | AverageSalaryValue | Customer | Customer [ ] | Double |
| 2 | Banking | Arrays | AverageBalanceValue | Account | Account [ ] | Double |
| 3 | Banking | Arrays | SortIdValue | Customer | Customer [ ] | Customer [ ] |
| 4 | Banking | Arrays | SortNameValue | Customer | Customer [ ] | Customer [ ] |
| 5 | Banking | Arrays | SortContactValue | Customer | Customer [ ] | Customer [ ] |
| 6 | Banking | Arrays | SortEmailValue | Customer | Customer [ ] | Customer [ ] |
| 7 | Banking | Arrays | SortSalaryValue | Customer | Customer [ ] | Customer [ ] |
| 8 | Banking | Arrays | SortIdValue | Account | Account [ ] | Account [ ] |
| 9 | Banking | Arrays | SortTypeValue | Account | Account [ ] | Account [ ] |
| 10 | Banking | Arrays | SortBalanceValue | Account | Account [ ] | Account [ ] |
| 11 | Banking | Arrays | FindIdValue | Customer | Customer [ ] | Customer [ ] |
| 12 | Banking | Arrays | FindIdValue | Account | Account [ ] | Account [ ] |

In accordance with the present disclosure, a sample question in the questionnaire may be:

For a Banking scenario, create class Customer with fields—id (as int), contact (as long), email (as String), salary (as Double). Next, write a method AverageSalaryValue which will take array of Customer class as input and return the average value of Salary for that array.

Likewise, all 12 questions may be generated with above configuration.

In an embodiment, a question may be generated where more than one operations are combined. For instance, for a Banking domain, a question may be:

For a Banking scenario, create class Customer with fields—id (as int), contact (as long), email (as String), salary (as Double). Next, write a method AverageSalaryValue which takes array of Customer class as input and return the average value of Salary for that array. Also, write a method SortEmailValue which takes array of Customer class as input and return array of Customer class sorted by Email values.

A level of difficulty associated with the question may be selected at step 210 and the level of difficulty is based on maximum complexity level of the operations referred in the question. Likewise, a question may have a single operation having a high complexity level.

In an embodiment, there may be combinations across concepts. For instance, a question may have a combination of concepts. Again, the level of difficulty may be decided based on maximum complexity level of the operations referred in the question.

At step 212, for evaluating a response to a questionnaire, the system may generate random specific values corresponding to the first set of variables as shown in an exemplary embodiment below.

If input is an array of customer entity, the system creates N entity values and generate field values as shown.

| Entity | Field | Type | Value |
|---|---|---|---|
| Customer | Id | Int | 1 |
| | Name | string | aa |
| | Dob | Date | Dec. 12, 1980 |
| | Contact | Int | 111 |
| | Email | String | aaa@ttt.com |
| | salary | double | 10000 |
| Customer | Id | Int | 2 |
| | Name | string | bb |
| | Dob | Date | Dec. 13, 1981 |
| | Contact | Int | 222 |
| | Email | String | bb@bb.com |
| | salary | double | 20000 |
| Customer | Id | Int | 2 |
| | Name | string | cc |
| | Dob | Date | Dec. 14, 1982 |
| | Contact | Int | 333 |
| | Email | String | cc@cc.com |
| | salary | double | 30000 |

A compliable code may be generated by the system as shown below.

```
public double AverageSalaryValue(Customer[ ]cus)
{
    double s = 0;
    for(Customer c:cus)
    {
        S=s+c.getSalaray( );
    }
    Return s/cus.size( );
}
```

Executing the compilable code using the specific values generated by the system, an output value of 20000 may be generated for the above exemplary embodiment.

The same specific values may be fed into the user compiled code and the generated output value is compared with the output value generated for the system compiled code to evaluate response to the question by a trainee.

Conventionally known systems and methods for question bank generation are limited by a specific template or cater to objective type questions. As against this the systems and methods of the present disclosure provide dynamic generation of questions wherein, elements of the system are re-usable, thereby making the system scalable and efficient. For instance, if an additional entity 'transaction' is to be added to a 'Banking' domain, the question generation logic may merely re-use the operations and generate more questions based on the configured fields. Likewise, for each added operation, domains, entities, fields may be re-used. Multiple mappings of the elements results in an efficient system that can dynamically meet demands of an IT industry, in particular, having extremely tight timelines for training and delivery. The questions generated are agnostic of the formal language associated with the programming language under consideration and questions are generated in a natural language in a customized manner.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor implemented method (200) comprising:
receiving at least one scenario statement (202) in a natural language pertaining to a domain for generation of at least one questionnaire based on a programming language under consideration;
processing the at least one scenario statement (204) to identify a first set of variables corresponding to the domain, the first set of variables including:
one or more entities corresponding to the domain, and
one or more fields mapped to each of the one or more entities;
wherein processing the at least one scenario statement comprises filtering words in the at least one scenario statement by performing:
stemming the words in the description to obtain root words;
eliminating stop words from the at least one scenario statement;
eliminating action words from the at least one scenario statement;
presenting, to a user, unique words by comparing remaining words in the at least one scenario statement with words in one or more repositories and filtering out existing words;
receiving, from the user, the first set of variables identified from the unique words and corresponding to the domain;
mapping the one or more fields from the unique words to the one or more entities; and
updating the one or more repositories with the one or more entities, the one or more fields and the mapping thereof, from the unique words;
receiving a second set of variables (206) corresponding to the programming language under consideration, the second set of variables including:
one or more programming concepts associated with the programming language under consideration, and
one or more operations mapped to the one or more programming concepts, each of the one or more operations being defined by (i) an input based on at least one of the one or more entities and the one or more fields, (ii) an output based on at least one of the one or more entities and the one or more fields and (iii) a description associated with a task to be performed based on the one or more programming concepts; and
dynamically generating the at least one questionnaire (208) associated with the domain, the at least one questionnaire comprising a plurality of questions on the programming language under consideration, based on at least one of the one or more entities, the one or more fields, the one or more concepts and the one or more operations, wherein the step of dynamically generating the at least one questionnaire is agnostic of a formal language associated with the programming language under consideration and the step of dynamically generating comprises generating the plurality of questions in a natural language in a customized manner.

2. The processor implemented method of claim 1, wherein the step of receiving at least one scenario statement is preceded by a step of creating (i) the one or more repositories of the one or more entities, the one or more fields and the mapping thereof; and (ii) one or more repositories of the one or more programming concepts, the one or more operations, the mapping thereof and formal language syntax rules corresponding to the programming language, in one or more data storage devices.

3. The processor implemented method of claim 1, wherein at least one of the first set of variables and at least one of the second set of variables are re-usable and having multiple mappings.

4. The processor implemented method of claim 1, wherein the step of dynamically generating the at least one questionnaire is preceded by selecting a pre-defined level of difficulty (210) associated with either (i) number of the one or more operations included in the plurality of questions or (ii) pre-defined complexity levels associated with the one or more operations included in the plurality of questions.

5. The processor implemented method of claim 1 further comprising evaluating a response to the at least one questionnaire (212) by:
generating specific values corresponding to the first set of variables in each of the plurality of questions;
generating a compilable code based on the one or more concepts and the one or more operations in each of the plurality of questions and the formal language syntax rules corresponding to the programming language;
executing the compilable code using the specific values;
generating an output value for each of the plurality of questions; and
comparing the output value with an output value of a user compiled code executed using the specific values.

6. The processor implemented method of claim 5 further comprising:
in dependence on the comparison, determining the first set of variables and the second set of variables for dynamically generating the at least one questionnaire.

7. A system (100) comprising:
one or more data storage devices (102) operatively coupled to one or more hardware processors (104) and configured to store instructions configured for execution by the one or more hardware processors to:
receive at least one scenario statement in a natural language pertaining to a domain (102A) for generation of at least one questionnaire based on a programming language (102B) under consideration;
process the at least one scenario statement to identify a first set of variables corresponding to the domain, the first set of variables including:
one or more entities (102A-1) corresponding to the domain, and
one or more fields (102A-2) mapped to each of the one or more entities;
wherein, the one or more hardware processors are configured to process the at least one scenario statement by filtering words in the at least one scenario statement by performing:
stemming the words in the description to obtain root words;
eliminating stop words from the at least one scenario statement;
eliminating action words from the at least one scenario statement;
presenting, to a user, unique words by comparing remaining words in the at least one scenario statement with words in the one or more repositories and filtering out existing words;
receiving, from the user, the first set of variables identified from the unique words and corresponding to the domain;

mapping the one or more fields from the unique words to the one or more entities; and updating one or more repositories with the one or more entities, the one or more fields and the mapping thereof, from the unique words;

receive a second set of variables corresponding to the programming language under consideration, the second set of variables including:

one or more programming concepts (102B-1) associated with the programming language under consideration, and one or more operations (102B-2) mapped to the one or more programming concepts, each of the one or more operations being defined by (i) an input based on at least one of the one or more entities and the one or more fields, (ii) an output based on at least one of the one or more entities and the one or more fields and (iii) a description associated with a task to be performed based on the one or more programming concepts; and dynamically generate the at least one questionnaire associated with the domain, the at least one questionnaire comprising a plurality of questions on the programming language under consideration, based on at least one of the one or more entities, the one or more fields, the one or more concepts and the one or more operations, wherein the one or more hardware processors are configured to dynamically generate the at least one questionnaire agnostic of a formal language associated with the programming language under consideration and the plurality of questions are in a natural language in a customized manner.

8. The system of claim 7, wherein the one or more hardware processors are further configured to create (i) the one or more repositories of the one or more entities, the one or more fields and the mapping thereof; and (ii) one or more repositories of the one or more programming concepts, the one or more operations, the mapping thereof and formal language syntax rules (102B-4) corresponding to the programming language, in one or more data storage devices.

9. The system of claim 7, wherein at least one of the first set of variables and at least one of the second set of variables are re-usable and having multiple mappings.

10. The system of claim 7, wherein the one or more hardware processors are further configured to dynamically generate the at least one questionnaire by selecting a pre-defined level of difficulty associated with either (i) number of the one or more operations included in the plurality of questions or (ii) pre-defined complexity levels associated with the one or more operations included in the plurality of questions.

11. The system of claim 7, wherein the one or more hardware processors are further configured to evaluate a response to the at least one questionnaire by:

generating specific values corresponding to the first set of variables in each of the plurality of questions;

generating a compilable code based on the one or more concepts and the one or more operations in each of the plurality of questions and the formal language syntax rules corresponding to the programming language;

executing the compilable code using the specific values;

generating an output value for each of the plurality of questions; and comparing the output value with an output value of a user compiled code executed using the specific values.

12. The system of claim 11, wherein the one or more hardware processors are further configured to:

in dependence on the comparison, determine the first set of variables and the second set of variables for dynamically generating the at least one questionnaire.

13. One or more non-transitory machine readable information storage mediums comprising one or more instructions which when executed by one or more hardware processors causes:

receiving at least one scenario statement (202) in a natural language pertaining to a domain for generation of at least one questionnaire based on a programming language under consideration;

processing the at least one scenario statement (204) to identify a first set of variables corresponding to the domain, the first set of variables including:

one or more entities corresponding to the domain, and one or more fields mapped to each of the one or more entities;

wherein processing the at least one scenario statement comprises filtering words in the at least one scenario statement by performing:

stemming the words in the description to obtain root words;

eliminating stop words from the at least one scenario statement;

eliminating action words from the at least one scenario statement;

presenting, to a user, unique words by comparing remaining words in the at least one scenario statement with words in one or more repositories and filtering out existing words;

receiving, from the user, the first set of variables identified from the unique words and corresponding to the domain;

mapping the one or more fields from the unique words to the one or more entities; and updating the one or more repositories with the one or more entities, the one or more fields and the mapping thereof, from the unique words;

receiving a second set of variables (206) corresponding to the programming language under consideration, the second set of variables including:

one or more programming concepts associated with the programming language under consideration, and one or more operations mapped to the one or more programming concepts, each of the one or more operations being defined by (i) an input based on at least one of the one or more entities and the one or more fields, (ii) an output based on at least one of the one or more entities and the one or more fields and (iii) a description associated with a task to be performed based on the one or more programming concepts; and dynamically generating the at least one questionnaire (208) associated with the domain, the at least one questionnaire comprising a plurality of questions on the programming language under consideration, based on at least one of the one or more entities, the one or more fields, the one or more concepts and the one or more operations, wherein the step of dynamically generating the at least one questionnaire is agnostic of a formal language associated with the programming language under consideration and the step of dynamically generating comprises generating the plurality of questions in a natural language in a customized manner.

14. The one or more non-transitory machine readable information storage mediums of claim 13, wherein at least one of the first set of variables and at least one of the second set of variables are re-usable and having multiple mappings.

15. The one or more non-transitory machine readable information storage mediums of claim 13, wherein the step of dynamically generating the at least one questionnaire is preceded by selecting a pre-defined level of difficulty (210) associated with either (i) number of the one or more operations included in the plurality of questions or (ii) pre-defined complexity levels associated with the one or more operations included in the plurality of questions.

* * * * *